US008516102B2

United States Patent
Chen et al.

(10) Patent No.: US 8,516,102 B2
(45) Date of Patent: Aug. 20, 2013

(54) COMPUTER MANAGING METHOD

(75) Inventors: Che-Hung Chen, Taipei (TW);
Yu-Cheng Chen, Taoyuan County (TW);
Tsun-Li Hung, Taipei County (TW);
Shang-Feng Chiang, Pingtung County (TW); Chih-Chien Hsu, Taoyuan County (TW)

(73) Assignee: Quanta Computer Inc., Tao Yuan Shien (TW)

( * ) Notice: Subject to any disclaimer, the term of this patent is extended or adjusted under 35 U.S.C. 154(b) by 339 days.

(21) Appl. No.: 12/843,962

(22) Filed: Jul. 27, 2010

(65) Prior Publication Data
US 2011/0196951 A1    Aug. 11, 2011

(30) Foreign Application Priority Data
Feb. 9, 2010   (TW) ............................... 99104009 A

(51) Int. Cl.
*G06F 15/173*   (2006.01)
*G06F 15/177*   (2006.01)
*G06F 15/16*    (2006.01)

(52) U.S. Cl.
USPC ............ 709/223; 709/220; 709/222; 709/250

(58) Field of Classification Search
USPC .......................................................... 709/223
See application file for complete search history.

(56) References Cited

U.S. PATENT DOCUMENTS

| 8,194,534 | B2 * | 6/2012 | Pandey et al. .................. 370/216 |
| 2005/0114474 | A1 * | 5/2005 | Anderson et al. ............. 709/220 |
| 2007/0002833 | A1 * | 1/2007 | Bajic .............................. 370/352 |
| 2007/0244994 | A1 * | 10/2007 | Bolan et al. .................... 709/220 |
| 2008/0040463 | A1 * | 2/2008 | Brown et al. .................. 709/223 |
| 2008/0098354 | A1 * | 4/2008 | Chen et al. .................... 717/120 |
| 2008/0275975 | A1 * | 11/2008 | Pandey et al. ................. 709/223 |
| 2008/0310421 | A1 * | 12/2008 | Teisberg et al. .......... 370/395.53 |
| 2009/0219835 | A1 * | 9/2009 | Bandholz et al. ............. 370/255 |
| 2011/0093574 | A1 * | 4/2011 | Koehler et al. ............... 709/222 |

\* cited by examiner

*Primary Examiner* — Richard G Keehn
(74) *Attorney, Agent, or Firm* — Rabin & Berdo, P.C.

(57) ABSTRACT

A computer managing method includes the following steps. Firstly, a blade server system with M blade server units, which includes a number of server blades and a modular management blade (MMB), is provided, wherein the M MMBs are connected with each other via network paths and M is a natural number greater than 1. Then a master MMB among the M MMBs are selected in response to first user operation event. Next, the network parameter data of the master MMB are set in response to second user operation event. Then network topology of the master MMB and the rest of M−1 MMBs are obtained via the master MMB. After that, the rest of M−1 MMBs are driven for utilizing a network protocol service so that the M−1 MMBs are able to receive network parameter data from the master MMB and carry out parameter setting accordingly.

5 Claims, 5 Drawing Sheets

COMPUTER MANAGING METHOD

This application claims the benefit of Taiwan application Serial No. 099104009, filed Feb. 9, 2010, the subject matter of which is incorporated herein by reference.

BACKGROUND OF THE INVENTION

1. Field of the Invention

The invention relates in general to a computer managing method, and more particularly to a computer managing method used in a blade server.

2. Description of the Related Art

With the rapid advance in technology, using personal computers in the processing of business has become a mainstream trend in business operation. In general, most computer servo workstations have a system manager in charge of the maintenance and control of multiple computer server systems and networks of a computer servo workstation. The technology of blade server is an existing technology for clustering the computing cores of multiple computer server systems of a computer servo workstation, so that the system manager can maintain and control multiple computer server systems clustered together with one set of user I/O interface devices. However, to perform system maintenance and parameter setting on various computer systems manually is an extremely inefficient way of managing computer systems of a business. Therefore, how to provide a convenient and efficient method for managing the blade server of a computer servo workstation has become an imminent task for the industries.

SUMMARY OF THE INVENTION

The invention is directed to a computer managing method used in a blade server system. The blade server system includes a number of blade server units each including a number of blade servers and a modular management blade (MMB). According to the computer managing method of the invention, an MMB is selected among the blade server system as a master MMB which performs the computer managing method for obtaining the network topology of the blade server system and carrying out the setting of network parameters for each of the MMBs of the blade server system. In comparison to the conventional managing method used in a blade server system, the computer managing method of the invention provides better convenience and is more efficient in terms of computer management.

According to a first aspect of the present invention, a computer managing method including the following steps is provided. Firstly, a blade server system with M blade server units, each including a number of server blades and a modular management blade (MMB) is provided, wherein the M MMBs are connected with each other via network paths, and M is a natural number greater than 1. Next, a master MMB is selected among the M first MMBs in response to a first user operation event. Then, the network parameter data of the master MMB are set in response to a second user operation event. Afterwards, the topology discovery communication protocol package is transmitted to the rest (M−1) first MMBs of the blade server system via the master MMB to obtain the network topology relationship between the master MMB and the (M−1) first MMBs. Lastly, the (M−1) first MMBs are driven via the master MMB to activate a network protocol service, wherein each of the (M−1) first MMBs receives network parameter data from the master MMB via the network protocol service for carrying out parameter setting on the M first MMBs accordingly.

The above and other aspects of the invention will become better understood with regard to the following detailed description of the preferred but non-limiting embodiment(s). The following description is made with reference to the accompanying drawings.

DETAILED DESCRIPTION OF THE INVENTION

The computer managing method of an embodiment of the invention is used in a blade server system for obtaining the network topology of local networks composed of the modular management blades (MMBs) of the blade server system and performing the setting of the network parameter data on each of the MMBs.

Figure 1:
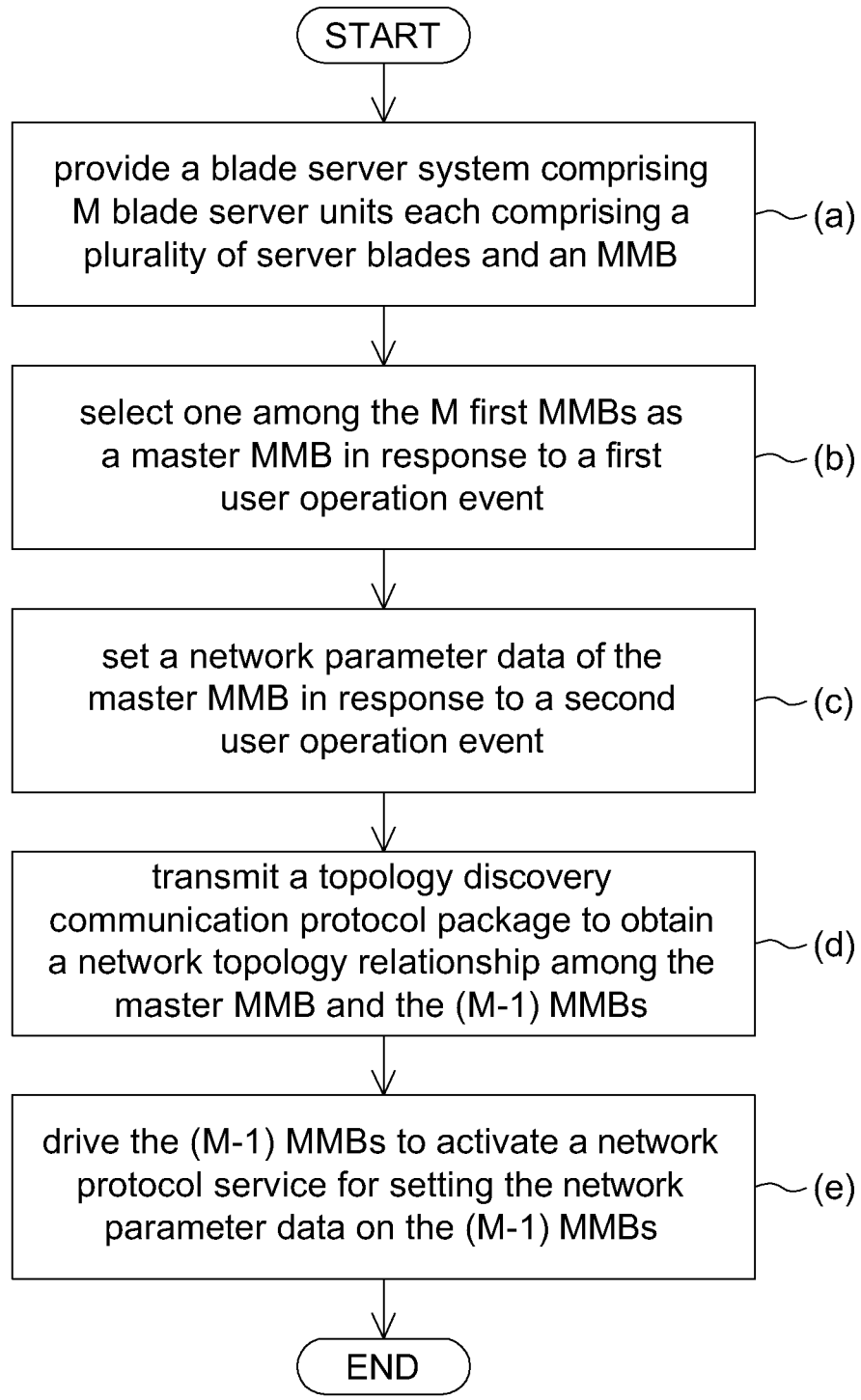
FIG. 1 shows a flowchart of a computer managing method according to an embodiment of the invention.
Figure 2:
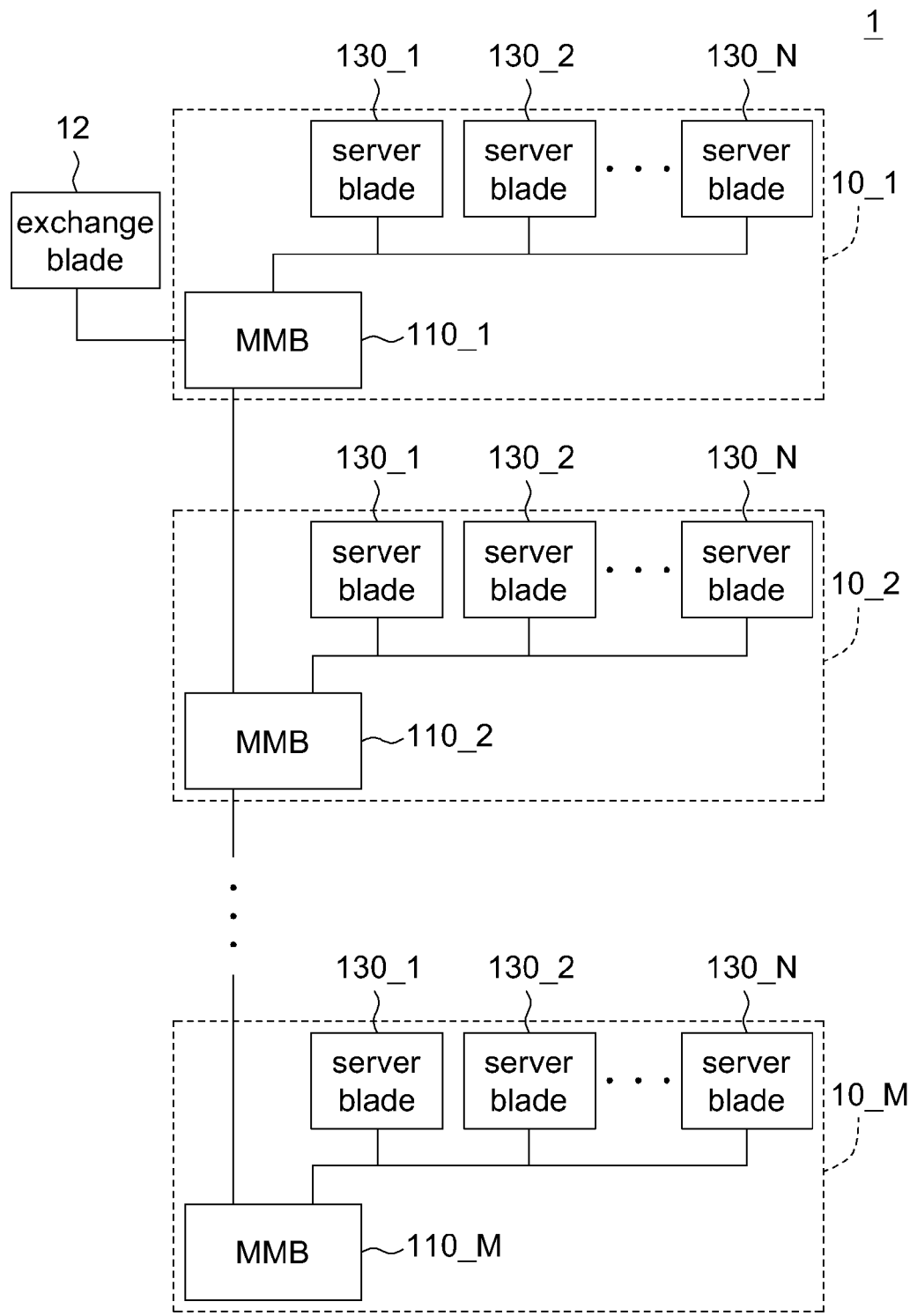
FIG. 2 shows a block diagram of a blade server system using the computer managing method according to an embodiment of the invention.

Referring to FIG. 1, a flowchart of a computer managing method according to an embodiment of the invention is shown. The computer managing method of the embodiment of the invention includes the following steps. Firstly, the method begins at step (a), a blade server system 1 is provided. For example, the blade server system 1 has a block diagram as illustrated in FIG. 2. The blade server system 1 includes an exchange blade 12 and M blade server units 10_1, 10_2, . . . , 10_M, wherein M is a natural number greater than 1. Each of the M blade server units 10_1-10_M includes N server blades 130_1, 130_2, . . . , 130_N and one of the M modular management blades (MMB) 110_1, 110_2, . . . , 110_M, wherein N is a natural number greater than 1. The M MMBs 110_1-110_M are connected with each other via network paths.

Then, the method proceeds to step (b), one among the M MMBs 110_1-110_M is selected as a master MMB M in response to a first user operation event. For example, the MMB 110_1 is selected as a master MMB M for controlling the MMBs 110_2-110_M of the blade server system 1.

After that, the method proceeds to step (c), the network parameter data of the master MMB M are set in response to a second user operation event. For example, the network parameter data includes the network address of the master MMB M. In an implementation, the user sets the network address of the master MMB M via the dynamic host configuration protocol (DHCP) or the static IP address.

After that, the method proceeds to step (d), the master MMB M transmits a topology discovery communication protocol package to the rest (M−1) MMBs 110_2-110_M of the blade server system 1 for obtaining the network topology relationship between the master MMB M and the (M−1) MMBs 110_2-110_M. For example, the topology discovery communication protocol package is conformed to the link layer discovery protocol (LLDP).

Figure 3:
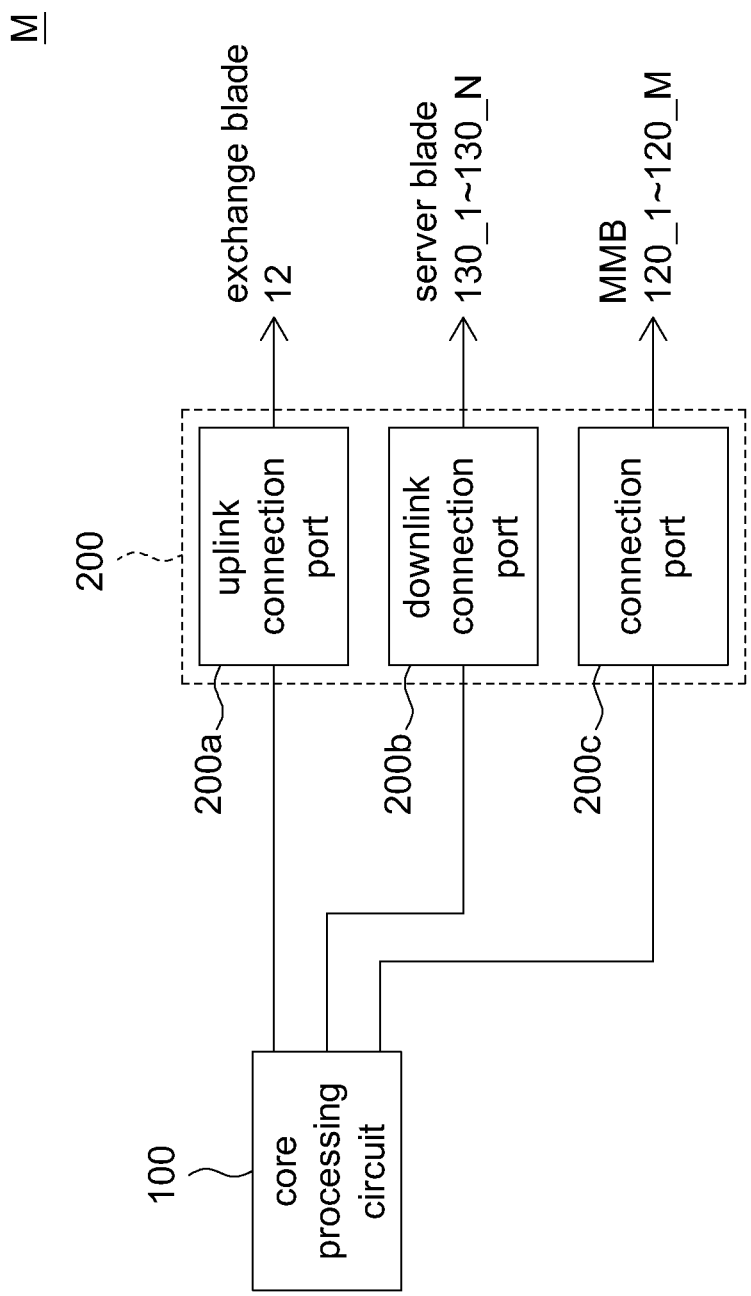
FIG. 3 shows a detailed block diagram of the master MMB M of FIG. 2.

Referring to FIG. 3, a detailed block diagram of the master MMB M of FIG. 2 is shown. For example, the master MMB M includes a core processing circuit 100 and a network exchange circuit 200. The network exchange circuit 200 includes an uplink connection port 200a and a downlink connection port 200b respectively connected to the exchange blade 12 and each of the server blades 130_1-130_N corresponding to the same blade server unit 10_1 with the master MMB M via network paths. The network exchange circuit 200 further includes a connection port 200c for connecting the rest MMBs 110_2-110_M via network paths.

There is bus control interfaces between the core processing circuit 100 and the uplink connection port 200a, between the core processing circuit 100 and the downlink connection port 200b, and between the core processing circuit 100 and the connection port 200c for controlling the operation mode of each connection port. For example, the bus control interface is realized by a serial peripheral interface (SPI).

In an implementation, before transmitting the topology discovery communication protocol package, the core processing circuit 100 of the master MMB M controls the uplink connection port 200a and the downlink connection port 200b to be operated in a switch protection mode via a bus control interface. For example, the connection port operated in the protection mode cannot receive the package transmitted from other connection ports operated in the protection mode or transmit the package to other connection ports operated in the protection mode. Thus, the topology discovery communication protocol package transmitted by the master MMB M can only be transmitted to the (M−1) MMBs 110_2-110_M corresponding to the rest (M−1) blade server units 10_2-10_M for obtaining the relative network relationship between the master MMB M and the MMB 110_2-110_M.

After that, the method proceeds to step (e), the master MMB M drives the rest (M−1) MMBs 110_2-110_M of the blade server system 1 to activate the network protocol service, wherein each of the (M−1) MMBs 110_2-110_M receives the network parameter data from the master MMB M via the network protocol service for performing the setting of network parameter data on the (M−1) MMBs 110_2-110_M. For example, the network protocol service is compatible with DHCP, in which the master MMB M serves as the DHCP host device and the (M−1) MMBs 110_2-110_M serve as the DHCP user end devices. Thus, each of the (M−1) MMBs 110_2-110_M can receive corresponding network parameter data from the master MMB M.

As a result, the user completes the setting of the network parameter data of the rest (M−1) MMBs 110_2-110_M of the blade server system 1 by setting the network parameter data via the master MMB M of the blade server system 1.

Though only the situation that the M blade server units 10_1-10_M respectively include the M MMBs 110_1-110_M is illustrated in the present embodiment of the invention, the computer managing method of the present embodiment of the invention is not limited thereto. In other example, the computer managing method of the present embodiment of the invention can further be used in the blade server system 2 with other circuit structure as illustrated in FIG. 4.

In another example, each of the M blade server units 20_1, 20_2, . . . , 20_M of the blade server system 2 includes two MMBs, wherein one MMB is redundant. For example, the blade server unit 20_1 includes two MMBs 210_1 and 220_1, wherein the MMB 210_1 performs the operation similar to the MMB 110_1 and is used as the master MMB M' of the blade server system 2, while the MMB 220_1 is a redundant MMB used as a replacement of the MMB 210_1 when the operation of the MMB 210_1 is abnormal.

The M blade server units 20_1-20_M respectively include the M non-volatile memory 240_1, 240_2, . . . , 240_M. The master MMB M' (that is, the MMB 210_1) is used for storing the network parameter data and the network topology data to the non-volatile memory 240_1. When the operation of the master MMB M' is abnormal, another MMB (that is, the MMB 220_1) corresponding to the same blade server unit performs operation according to the data stored in the non-volatile memory 240_1 so as to replace the master MMB M'.

Figure 4:
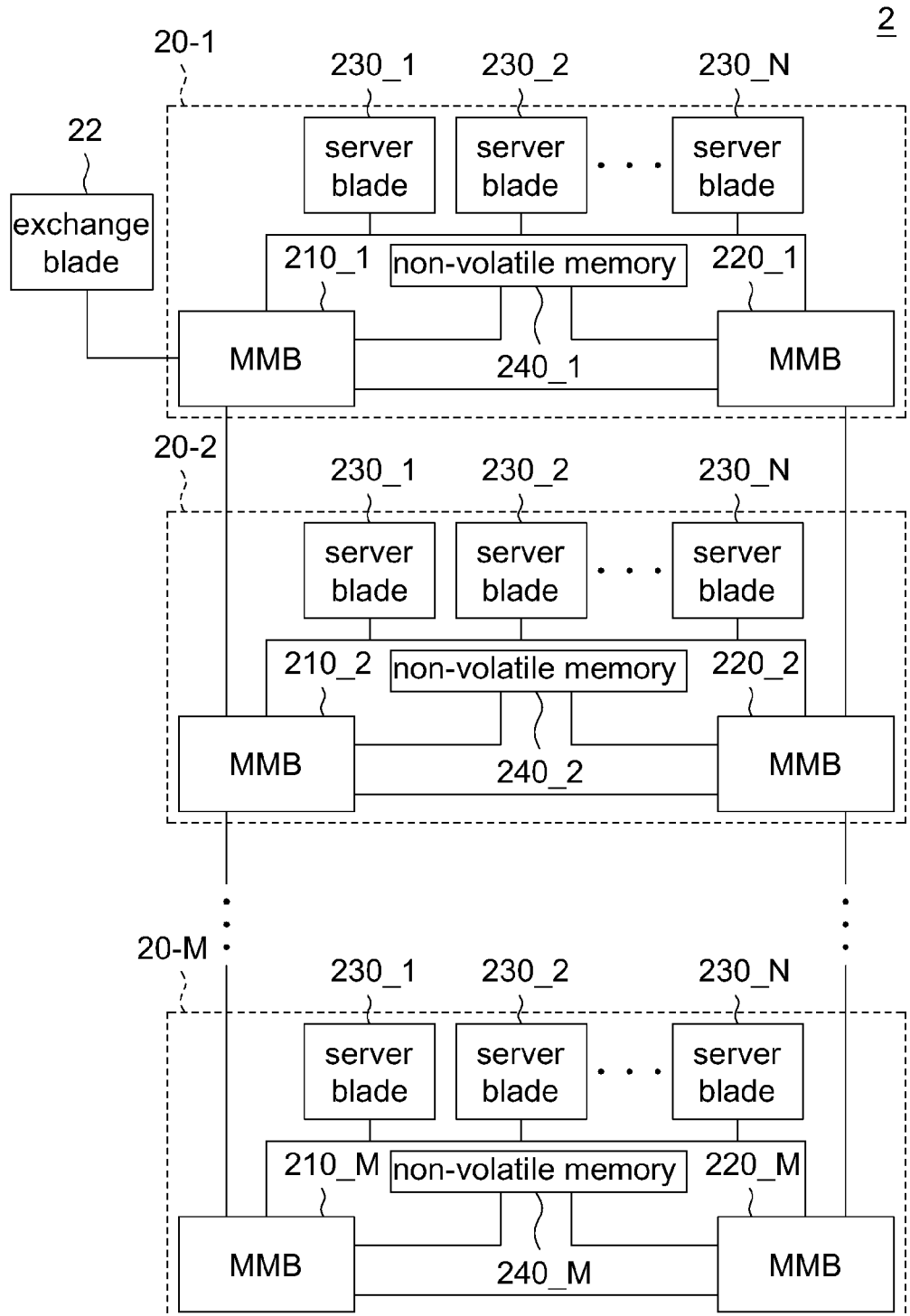
FIG. 4 shows another block diagram of a blade server system using the computer managing method according to an embodiment of the invention.
Figure 5:
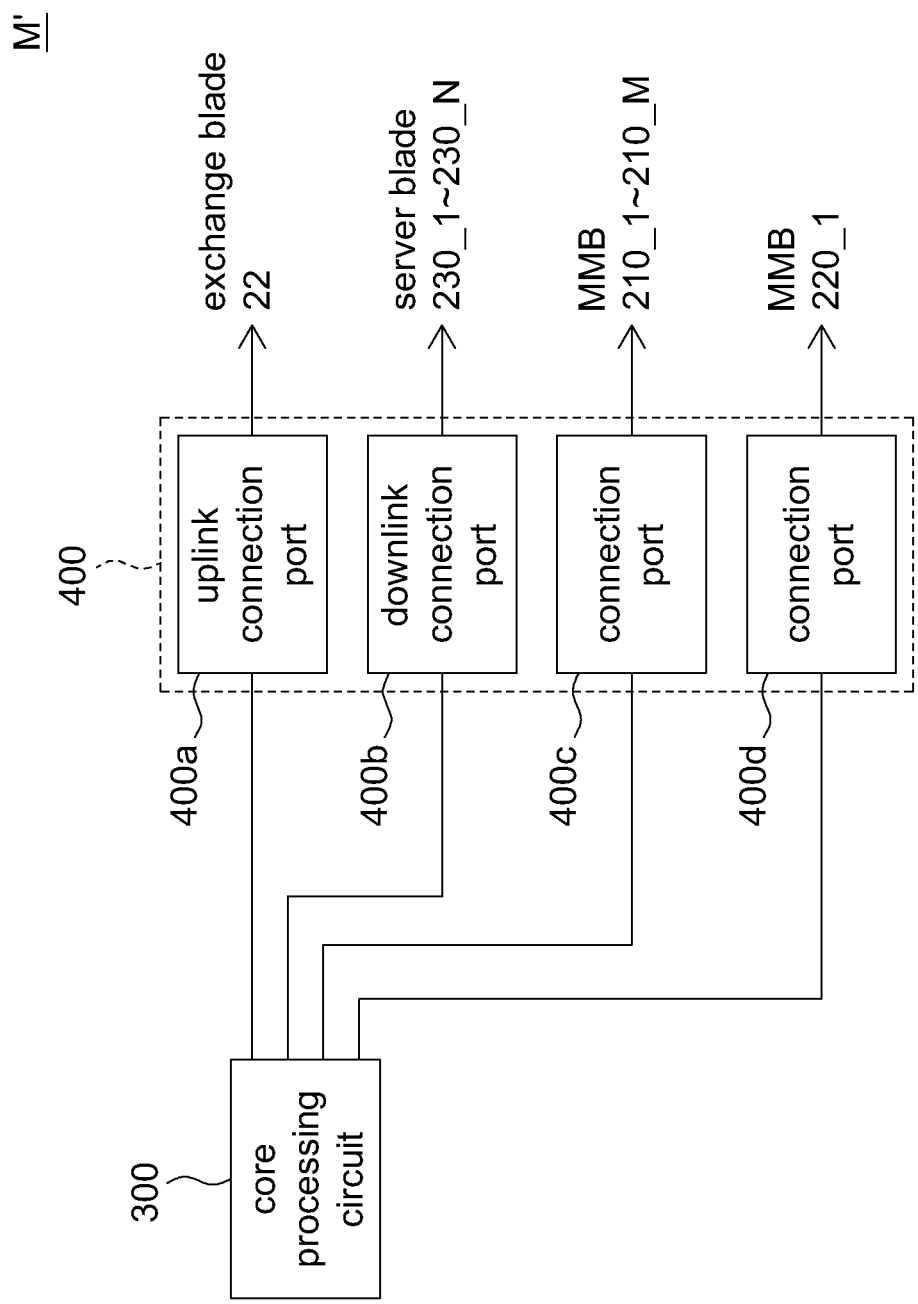
FIG. 5 shows a detailed block diagram of the master MMB M' of FIG. 4.

Referring to FIG. 5, a detailed block diagram of the master MMB M' of FIG. 4 is shown. For example, the master MMB M' includes a core processing circuit 300 and a network exchange circuit 400. Like the network exchange circuit 200, the network exchange circuit 400 includes an uplink connection port 400a, a downlink a connection port 400b and a connection port 400c, which are respectively connected to the exchange blade 12, each of the server blades 130_1-130_N corresponding to the same blade server unit 10_1 with the master MMB M', and the MMBs of the rest (M−1) blade server units 20_2-20_M via network path. The network exchange circuit 400 is different from the network exchange circuit 200 in that the network exchange circuit 400 further includes a connection port 400d for connecting to the MMB 220_1 corresponding to the same blade server unit 20_1 with the master MMB M'. Thus, before the master MMB M' transmits the topology discovery communication protocol package, the core processing circuit 300 of the master MMB M' controls the uplink connection port 400a, the downlink connection port 400b and the connection port 400d to be operated in a protection mode via the bus control interface. Thus, the topology discovery communication protocol package transmitted by the master MMB M' can only be transmitted to MMB 210_2-210_M corresponding to the rest (M−1) blade server units 20_2-20_M for obtaining the relative network relationship between the master MMB M' and the MMB 210 2-210 M.

The computer managing method of the embodiment of the invention is used in a blade server system which includes a number of blade server units each including a number of blade servers and an MMB. According to the computer managing method, one MMB of the blade server system is selected and used as a master MMB which performs the computer managing method for obtaining the network topology of the blade server system and setting of network parameter data of each MMB of the blade server system. In comparison to the conventional computer managing method used in a blade server system, the computer managing method of the embodiment of the invention provides better convenience and is more efficient in terms of computer management.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A computer managing method, comprising:
providing a blade server system comprising M blade server units each comprising a plurality of server blades and a first modular management blade (MMB), wherein the M first MMBs of the M blade server units are connected with each other via network paths, and M is a natural number greater than 1, selecting one among the M first MMBs as a master MMB in response to a first user operation event;
setting a network parameter data of the master MMB in response to a second user operation event;
transmitting a topology discovery communication protocol package to the rest (M−1) first MMBs of the blade server system via the master MMB to obtain a network topology relationship between the master MMB and the (M−1) first MMBs;

driving the (M−1) first MMBs to activate a network protocol service via the master MMB, wherein each of the (M−1) first MMBs receives a network parameter data from the master MMB via the network protocol service, for performing the setting of network parameter data on the (M−1) first MMBs;

providing a second MMB in response to each of the M blade server units; and providing a non-volatile memory in response to each of the M blade server units, wherein the master MMB stores the network parameter data and the network topology relationship data to the non-volatile memory provided in response to said each blade server unit, wherein, when the operation of the master MMB is abnormal, the second MMB provided in response to said each blade server unit performs operations according to the data stored in the non-volatile memory provided in response to said each blade server unit, so as to replace the master MMB with the second MMB, wherein the non-volatile memory provided in response to said each blade server unit is physically coupled to the master MMB and to the second MMB replacing the master MMB.

2. The computer managing method according to claim 1, wherein the topology discovery communication protocol package is conformed to the link layer discovery protocol (LLDP).

3. The computer managing method according to claim 1, wherein the network protocol service is conformed to the dynamic host configuration protocol (DHCP), and the master MMB provides the network parameter data to each of the (M−1) first MMBs via the DHCP.

4. The computer managing method according to claim 1, before the step of driving the master MMB to transmit the topology discovery communication protocol package, the method further comprises:

controlling a network uplink path and a network downlink path of the master MMB to be operated in a protection mode.

5. The computer managing method according to claim 1, before the step of driving the master MMB to transmit the topology discovery communication protocol package, the method further comprises:

controlling a network uplink path and a network downlink path of the master MMB to be operated in a protection mode with a network path between the master MMB and the second MMB corresponding to the same blade server unit.

* * * * *